United States Patent
O'Dell (10) Patent No.: US 7,944,165 B1
(45) Date of Patent: May 17, 2011

(54) INSPECTION SYSTEM WITH DUAL ENCODERS

(75) Inventor: Thomas A. O'Dell, Sunnyvale, CA (US)

(73) Assignee: WD Media, Inc., San Jose, CA (US)

( * ) Notice: Subject to any disclaimer, the term of this patent is extended or adjusted under 35 U.S.C. 154(b) by 463 days.

(21) Appl. No.: 12/114,607

(22) Filed: May 2, 2008

(51) Int. Cl.
*G01P 3/481* (2006.01)
(52) U.S. Cl. .................. 318/461; 318/490
(58) Field of Classification Search .......... 318/452–458, 318/461, 465, 478, 490
See application file for complete search history.

(56) References Cited

U.S. PATENT DOCUMENTS

| | | | |
|---|---|---|---|
| 4,847,555 A * | 7/1989 | Stammer et al. | 324/161 |
| 5,051,913 A | 9/1991 | Kume et al. | |
| 5,099,185 A * | 3/1992 | Kono et al. | 318/799 |
| 5,101,148 A * | 3/1992 | Yamashita et al. | 318/603 |
| 6,630,659 B1 | 10/2003 | Stridsberg | |
| 6,653,829 B1 | 11/2003 | Henry et al. | |
| 6,762,575 B2 | 7/2004 | Douglas | |
| 6,822,414 B2 | 11/2004 | Morita et al. | |
| 7,038,225 B2 | 5/2006 | Kuo et al. | |
| 2002/0024910 A1 | 2/2002 | Shiomi | |
| 2009/0254301 A1* | 10/2009 | O'Gorman et al. | 702/151 |

OTHER PUBLICATIONS

"Encoders for Servo Drives", Heidenhain catalog, Nov. 2006.

* cited by examiner

*Primary Examiner* — Bentsu Ro (57) ABSTRACT

A dual encoder motion control system for high speed and high resolution motion control of a spindle is described.

12 Claims, 6 Drawing Sheets

INSPECTION SYSTEM WITH DUAL ENCODERS

TECHNICAL FIELD

Embodiments described herein relate to the field of inspection systems and, more particularly, to a dual encoder inspection system.

BACKGROUND

At various points during manufacturing (e.g. before or after texturing) of a workpiece, it is desirable to inspect a workpiece for bumps, pits, contaminant particles, or other defects. Conventional optical inspection systems rotate a workpiece with a single encoder spindle system to move the workpiece relative to laser beams that scan the workpiece for defects. A single encoder in some conventional optical inspection systems may be designed for high speed scanning, but has a low resolution. For example, one optical inspection system manufactured by KLA-Tencor uses a single encoder with high scanning speed, but with a low resolution of 0.25 degrees. Other conventional optical inspection systems are designed with a single encoder that has a high resolution but low scanning speed, for example, KLA-Tencor's Candela Optical Surface Analyzer (OSA).

Using such single encoder spindle systems requires a tradeoff between a static high resolution angular positioning capability and a maximum rotational speed due to the bandwidth limitation of the encoder signals.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known fabrication processes and integration techniques have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

It should be noted that the "line" or "lines" discussed herein, that connect elements, may be single lines, multiple lines or a bus. It will also be understood by one having ordinary skill in the art that lines or other coupling elements may be identified by the nature of the signals they carry (e.g., a "command line" may implicitly carry a "command signal") and that input and output ports may be identified by the nature of the signals they receive or transmit (e.g., "command input" may implicitly receive a "command signal"). A "workpiece" is any object to be inspected. As used herein, "reflected" includes specularly reflected light and/or scattered light.

A dual encoder motion control system is described herein. Embodiments of the dual encoder motion control system may be used with an inspection system to inspect a workpiece. As used herein, the term "inspect" includes testing a workpiece surface for the presence of defects; evaluating the surface; collecting data concerning the surface of the workpiece; or determining whether the surface is suitable based on one or more criteria. Although embodiments of the present invention are discussed herein at times in relation to a system for inspecting magnetic recording disks, the apparatus and methods of the present invention may also be used with other types of inspection systems, for example, semiconductor wafer inspection systems, thin panel display inspection systems and lens inspection systems.

Figures 1A, 1B:
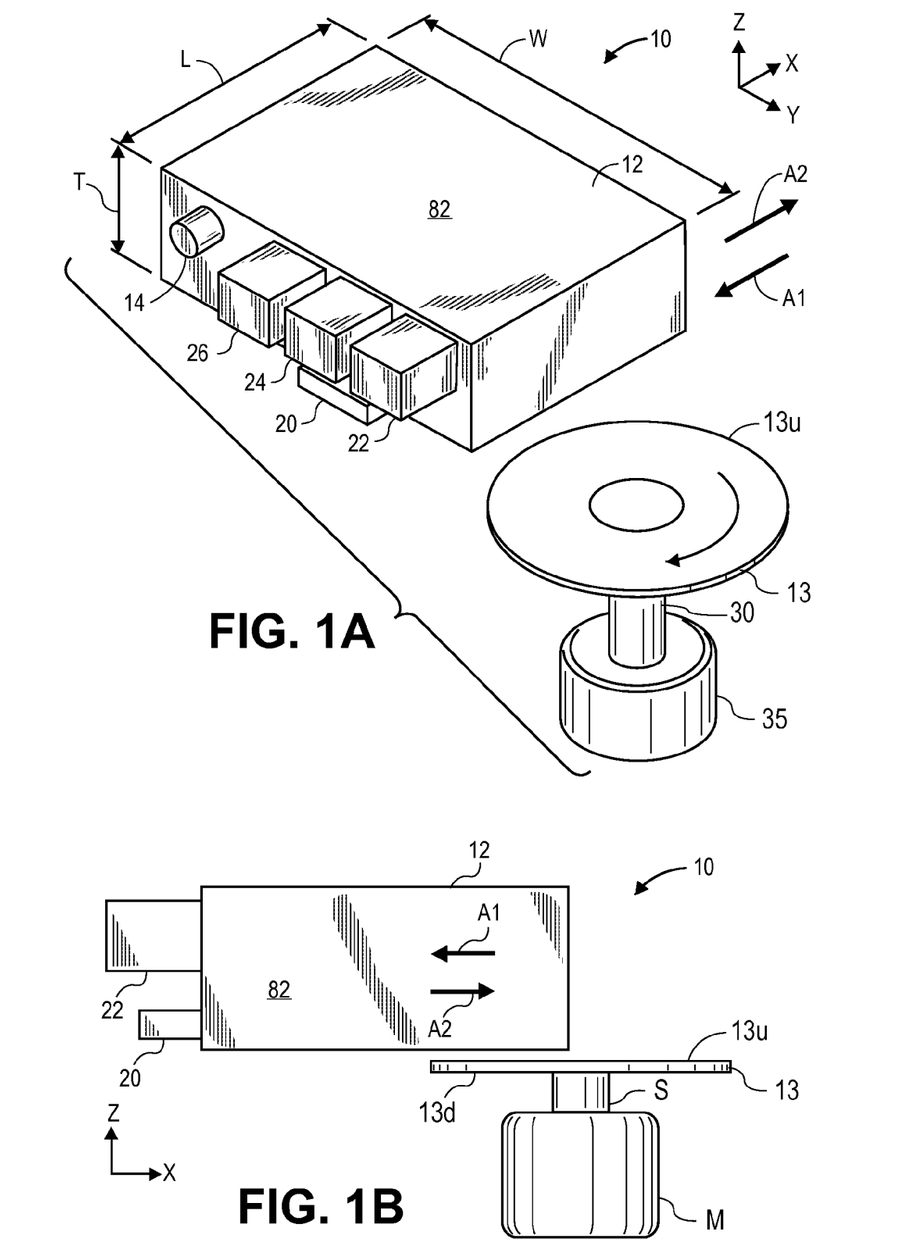
FIGS. 1A and 1B illustrate some components of an optical inspection system including an optical inspection head for inspecting a workpiece.

FIGS. 1A and 1B illustrate exemplary components of an optical inspection apparatus 10 in accordance with one embodiment of the invention that includes a head 12 for optically inspecting a top surface 13u of workpiece 13 (e.g., a platter). Head 12 includes a laser source 14 for providing a laser beam. Head 12 also includes a set of lenses, masks, mirrors and other optical elements for modifying the laser beam and directing and focusing the laser beam onto a spot on surface 13u. Head 12 also includes a set of mirrors, lenses and other optical elements for modifying and directing light reflected by surface 13u to various detectors 20 and 26. Output signals from detectors 20 and 26 are processed to determine the condition of surface 13u.

In one embodiment, laser source 14 is a solid state laser (e.g. a diode laser) having a wavelength of 660 nm. In other embodiments, different types of laser sources (such as a gas laser) and different types of laser light (including light outside the visible range) can be used. The laser spot on surface 13u can be circular, elliptical, or can have another shape. In one embodiment, the laser spot is substantially elliptical, and can be 8 microns in the azimuthal direction of workpiece 13, and 25 to 30 microns in the radial direction of workpiece 13. The laser can be linearly polarized, circularly polarized or randomly polarized.

During use, spindle motor 35 rotates spindle 30, which in turn rotates workpiece 13. Concurrently, laser beam 19 (see FIG. 2) moves in a direction of arrow A1 relative to workpiece 13 to thereby sweep across workpiece surface 13u. Accordingly, the entire usable portion of surface 13u is scanned by laser beam 19 to thereby inspect surface 13u for defects. In one embodiment, workpiece 13 moves in a direction A2 while it rotates, and head 12 remains stationary. In another embodiment, head 12 moves in direction A1 while workpiece 13 merely rotates. In yet another embodiment, head 12 and workpiece 13 simultaneously move in directions A2 and A1, respectively, while workpiece 13 rotates. In yet another embodiment, the angle of laser beam 19 changes so that beam 19 sweeps across surface 13u while workpiece 13 rotates. There is relative translational motion between laser beam 19 and workpiece 13 which permits surface 13u to be inspected. In yet another embodiment, the laser sweeps in directions along two axes while workpiece 13 is stationary. In one embodiment, workpiece 13, motor 35 and spindle 30 are moved in direction A2 by a stepper motor, linear motor, or other type of motor (not shown) while head 12 remains stationary. In alternative embodiments, scanning technologies other than that described above be used to locate defects, or otherwise, inspect the workpiece, for example, x-ray scanning.

Figure 2:
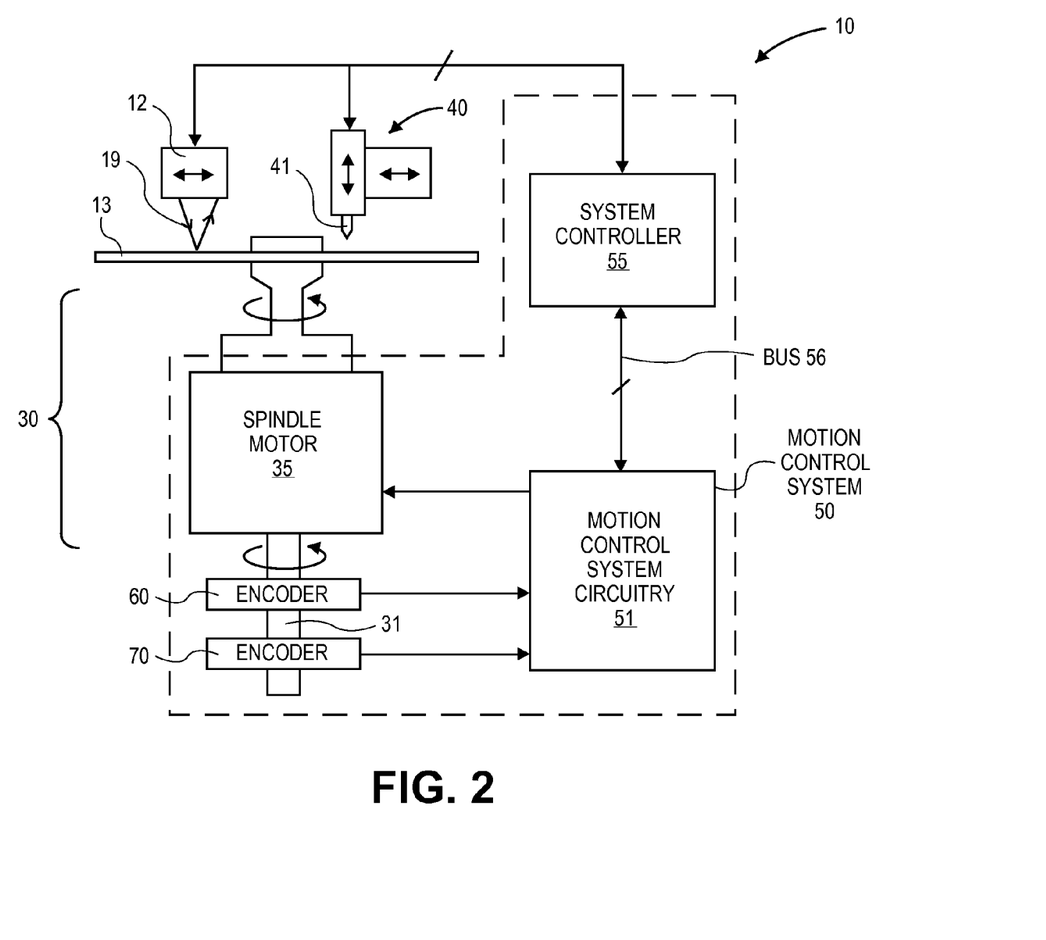
FIG. 2 illustrates further components of an optical inspection system, according to one embodiment of the present invention.

FIG. 2 illustrates further components of the optical inspection system 10, according to one embodiment of the present invention. Optical inspection system 10 includes a spindle assembly 30 having a spindle motor 35 and a shaft 31 configured to receive and secure workpiece 13. The optical inspection system 10 also includes an optical scanner 12 configured to identify a defect location on the workpiece 13 and a marking tool 40 configured to mark the identified defect location on the workpiece 13. Motion control system 50 has two different encoders 60 and 70 that are coupled to the spindle assembly 30 and a system controller 55. The system controller 55 is coupled to the optical scanner and marking tool 40 and operates as an interface to the motion control system. The motion control system 50 spins the spindle motor 35 at a high constant velocity and then the system controller 55 translates the optical scanner 12 to move across the radius of workpiece 13, which in combination with the spinning workpiece, creates a spiral trajectory for the optical scanning spot. As is described in more detail below, the motion control system 50 determines, using encoder 60, angular positions of the shaft 31 of the spindle assembly 30 that correspond to defect locations on workpiece 13 identified by the optical scanner 12.

When scanning is complete, the system 10 stops the rotation of the spindle shaft 31, and generates a map of the defect locations on the workpiece 13. The system operator may then choose the defect locations from the map to be marked by the marking tool 40. The motion control system 50 then uses encoder 70 to correlate the first angular position of the shaft 31 and rotates the shaft 31 of spindle assembly 30 to a second angular position using encoder 70 to enable the mark tool 40 to mark the defect location on workpiece 13. More particularly, to mark a defect location, the motion control system 50 will switch over to use a higher resolution, lower speed, (relative to encoder 60) encoder 70 as the encoder input for the spindle control. The motion control system 50 then rotates the spindle shaft 31 using encoder 70 and correlates the angular position of the lower resolution encoder 60 with the higher resolution encoder 70. The motion control system 50 then rotates the spindle shaft 31 and stops at a defect angle location that was recorded during the prior scanning. The system controller 55 translates the marking tool 40 to the radius location that was recorded during the scan and moves marking tool tip 41 to make a mark on workpiece 13 indicative of the defect location. In one embodiment, the mark position and the defect location may not be exactly coincidence with each other, but are offset by a prescribed amount. Marking exactly coincident with the defect location may destroy, or otherwise damage, the defect and, thereby, prevent inspection of the defect if a subsequent analysis of the defect is performed. Accordingly, marking of the workpiece 13 at location that is offset from the defect by a predetermined amount allows enables the system to know the location of the defect without potentially damaging the defect.

In an alternative embodiment, the mark and defect location may be coincident, for example, where potential damage to the defect is not of concern or where the marking technique used may not damage the defect. It should be noted that although the system controller 55 is illustrated as a separate component, the operations of system controller 55 may be integrated with the motion control system 50. The motion control system includes circuitry 51 that is discussed in detail below in regards to FIGS. 3 and 4.

Figure 3:
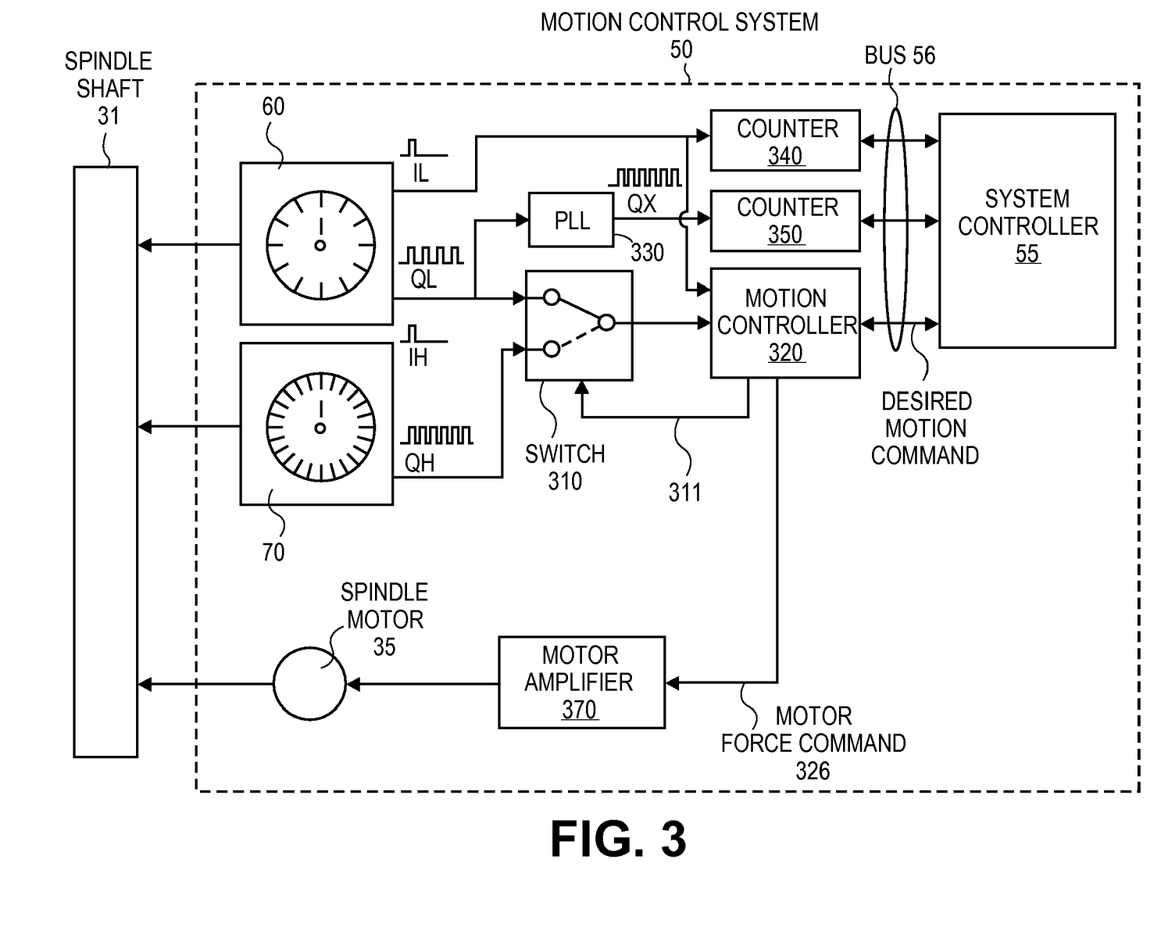
FIG. 3 illustrates components of the motion control system according to one embodiment of the present invention.
Figure 4:
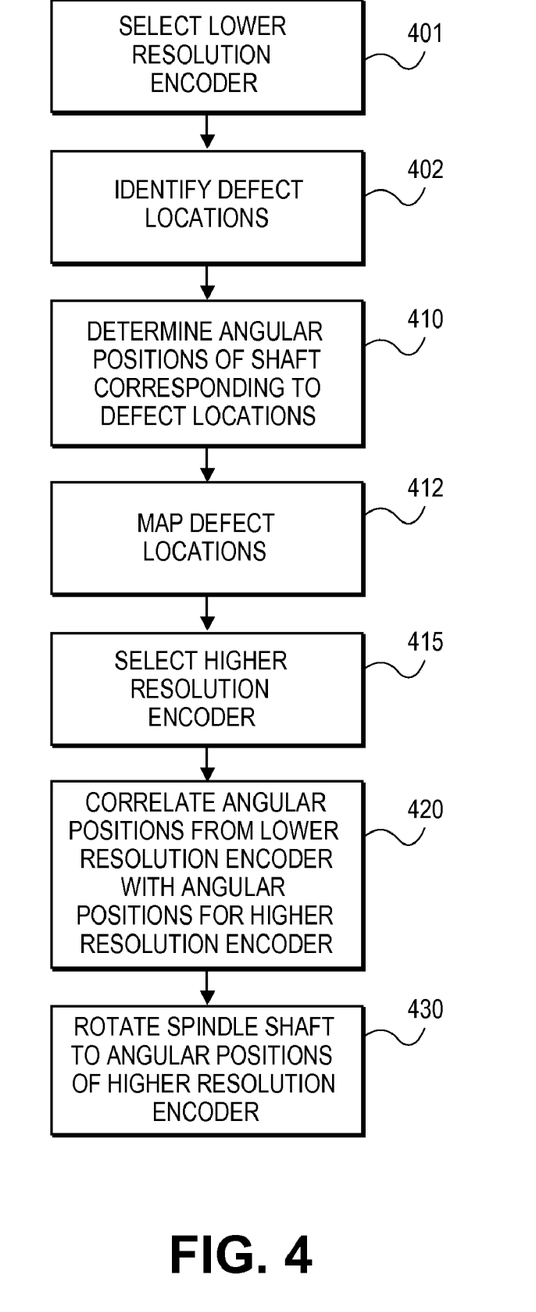
FIG. 4 is a flowchart illustrating the operation of the motion control system of FIG. 3, according to one embodiment of the present invention.

FIG. 3 illustrates components of the motion control system according to one embodiment of the present invention. FIG. 4 is a flowchart illustrating the operation of the motion control system of FIG. 3, according to one embodiment of the present invention. The following description of the motion control system is made in reference to both FIGS. 3 and 4. In one embodiment, motion controller 320 sends a control signal to switch 310 via control line 311 to select the lower resolution, high speed encoder 60 as the encoder input for the motion controller 320, step 401. In one embodiment, motion control system 50 then spins the spindle motor 35 at a constant velocity of approximately 12,000 revolutions per minute (RPM). In one particular embodiment, a Heidenhain ERO 1420 encoder, manufactured by Encoder Technology Ltd of the UK, with a quadrature output of 4096 counts per revolution and a maximum velocity of 17,500 RPM may be used as lower resolution encoder 60. Alternatively, other encoders and other rotational velocities greater than 10,000 revolutions per minute may be used. The system controller 55 may then translate the optical scanner 12 to move across the radius of workpiece 13, which in combination with the spinning workpiece, creates a spiral trajectory for the optical scanning spot so that defect locations on the workpiece may be identified, step 402.

Figure 6:
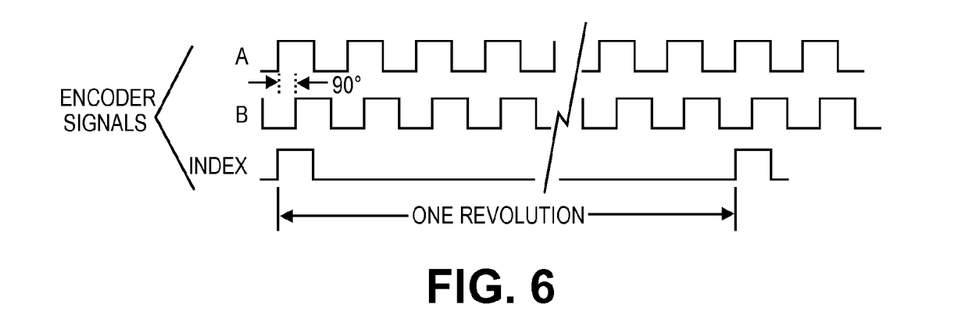
FIG. 6 illustrates an exemplary relative phase difference of the output signals of lower and higher resolution encoders, according to one embodiment of the present invention.

Each of the spindle encoders 60 and 70 generates two outputs. One encoder output is a number of pulses per revolution called Q, and the other is a single pulse per revolution called I. The Q output (QH) from the high resolution encoder 70 is fed to the switch 310. The Q output (QL) from the lower resolution encoder 60 is fed switch 310 and to a phase locked loop (PLL) multiplier circuit 330 that generates output QX. The I output, or index pulse (IL), signal from the lower resolution encoder 60 and QX signal are fed to counters 340 and 350, respectively. The motion direction is encoded by the relative phase of the encoders 60 and 70 output signals A and B, which can be, for example, +/−90 degrees, as illustrated in FIG. 6. The motion controller encoder count automatically increments or decrements with each transition of the encoder A or B signals depending on direction.

Referring again to FIGS. 3 and 4, counter 340 receives an input pulse every time workpiece 13 completes a revolution. These index pulses IL are counted by counter 340, which provides a track address on a track address bus in response thereto. The track address is the number of the track currently scanned by the optical scanner. Counter 350 receives input pulses QX from PLL 330. In one embodiment, these pulses are provided at a rate of 262,144 pulses per workpiece revolution, although this number is merely exemplary. The input pulses are synchronized with the disk rotation by generating the sampled pulses in response thereto and using the PLL to create an in-phase multiple of the lower resolution encoder 60 pulses QL. Counter 350 counts the input clock pulses and provides a sector address on a bus 56 to the system controller 55. The track and sector addresses may be stored in FIFO memories (not shown) in response to a signal representing the beginning and end locations of a defect on workpiece 13. System controller 55 reads the track and sector addresses from the motion controller 320 (or from stored memory) and uses the information to control the marking tool 40 as discussed below. As mentioned above, separate counters 340 and 350 are used to generate track and sector addresses. However, in an alternate embodiment, a single counter can be used to generate both the track and sector addresses. System controllers and motion controllers are known in the art, further details of which may be found, for example, in U.S. Pat. No. 7,184,139. Accordingly, a further detailed discussion is not provided herein.

During the scan, the system controller 55, using lower resolution encoder 60, determines the angular positions of shaft 31 corresponding to the defect locations identified by the optical scanner and records the location of defects on the workpiece 13 based on the values of the counters 340 and 350 (e.g., the track and sector addresses), step 410. The purpose of the PLL multiplier circuit 330 which generates QX is to achieve a higher resolution for the location information then can be achieved by using signal QL. The PLL multiplier circuit 330 output QX is only valid when the spindle shaft 31 is spinning.

When the scan is complete, motion controller 320 stops the spindle, and generates a map of the defect locations on the workpiece 13, step 412. A system operator can then choose the defect locations from the map to be marked by the marking tool 40. To mark a defect location on workpiece 13, the system controller 55 commands the motion controller 320 to signal switch 310 to select the higher resolution, lower speed, encoder 70 as the encoder input for the motion controller 320, step 415. The motion controller 320 then sends a motor force command 326 to motor amplifier 370 which, in turn, generates one or more signals that drive the spindle motor coils to cause the spindle motor 35 to rotate shaft 31 until it finds an index pulse IL from the lower resolution encoder 60. This then allows the system controller 55 to correlate the angular position of the lower resolution encoder 60 with the higher resolution encoder 70, step 420 of FIG. 4.

Figure 7:
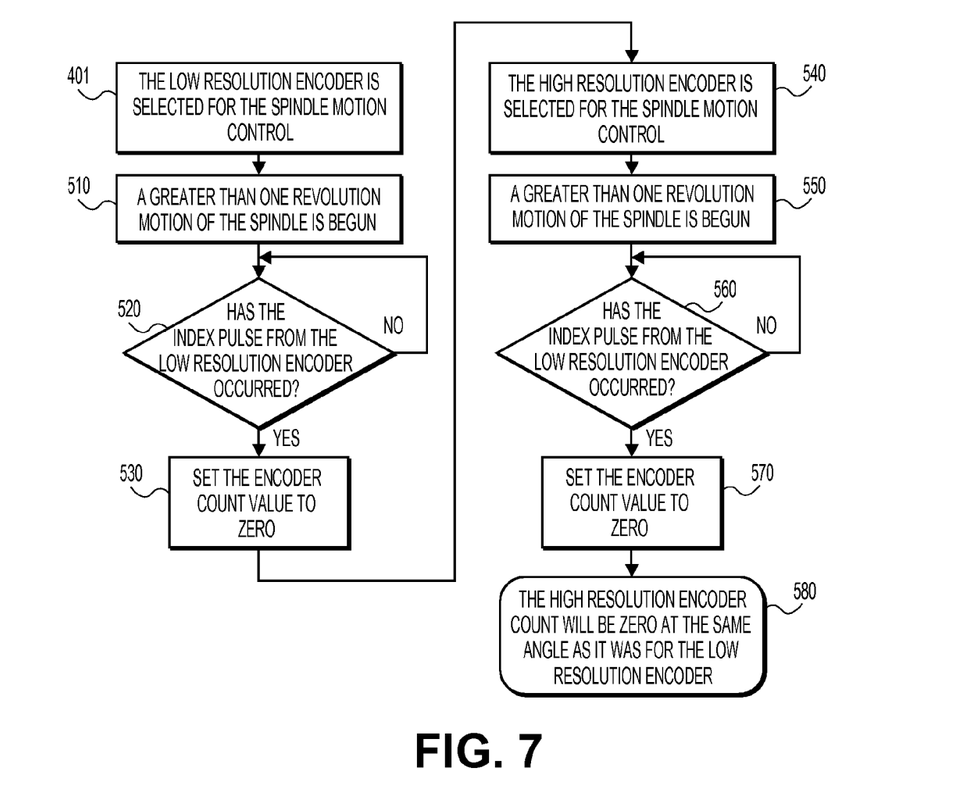
FIG. 7 is a flow chart illustrating the correlation of angular positions of the lower and higher resolution encoders, according to one embodiment of the present invention.

FIG. 7 is a flow chart illustrating the correlation of angular positions of the lower and higher resolution encoders, according to one embodiment of the present invention. After the low resolution encoder 60 is selected for spindle motion control, step 401, a greater than one revolution motion of the spindle is begun, step 510. Then, in step 520, a determination is made of whether the index pulse (as discussed above) from the low resolution encoder 60 occurred. When this has occurred, the encoder count value is set to zero, step 530. The high resolution encoder 70 is then selected for spindle motion control, step 540. A greater than one revolution motion is begun, step 550. If the index pulse IL from the lower resolution encoder 60 is determined to have occurred, step 560, then the encoder count value is set to zero, step 570. The higher resolution encoder 70 count will be zero at the same angle as it was for the lower resolution encoder 60, step 580.

Referring back to FIG. 4, after the correlation of the angular positions of the encoders, the motion controller 320 then outputs a motor force command signal 326 to the motor amplifier 370 to cause the spindle motor 35 to rotate the spindle shaft 31 to the angular positions of the higher resolution encoder, step 430 of FIG. 4. The higher resolution encoder 70 may have a quadrature output of greater than 15,000 counts per revolution. In one particular embodiment, a Heidenhain ERO 1470 encoder with a quadrature output of 20,000 counts per revolution and a maximum velocity of 1200 rpm may be used as the higher resolution encoder 70. Alternatively, other encoders and other quadrature outputs of greater than 15,000 counts per revolution may be used.

If the motion controller 320 does not switch the encoder input for the spindle motion control from the lower resolution encoder 60 to the higher resolution encoder 70 for defect marking, the angular control for the static position of the spindle shaft 31 is limited by encoder output (QL).

The physical motion of motion axis in the system, such as the spindle rotation is controlled by two main elements, namely the system controller 55 and the servo motion controller 320. The purpose of the system controller 55 is to provide the desired motion commands to the servo motion controller 320. The purpose of the motion controller 320 is to execute those commands. In one embodiment, the motion controller 320 executes motion commands using a closed loop feedback configuration which generates a motor force command 326 that is a function of the desired axis motion and the observed axis motion based on the axis encoder outputs QH and QL. The motion controller 320 function is optimized to minimize the difference between the desired axis motion and the actual axis motion. The precision of the axis motion is limited by the motion encoder which translates the actual motion into the electrical signals used by the motion controller 320. In one exemplary embodiment, motion controller 320 is a Navigator System PID (Proportional, Integral and Differential) motion controller manufactured by Performance Motion Devices and the spindle motor 35 is a three phase brushless DC type. Alternatively, other motion controllers for servo control and spindle motors may be used. Servo motion controllers are known in the art; accordingly, additional details are not provided herein.

Figure 5:
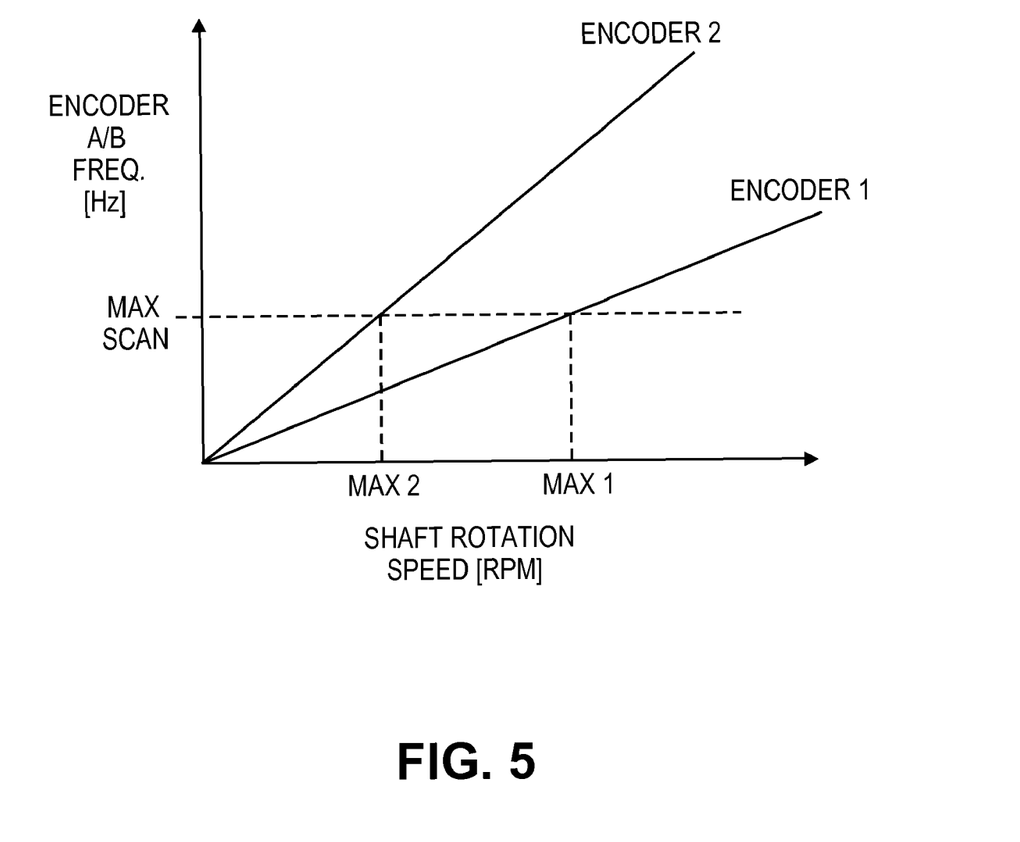
FIG. 5 is a graph illustrating the rotation speed of a spindle shaft for higher and lower resolution encoders, according to one embodiment of the present invention.

For optical scanning encoders of a particular technology there is a maximum speed for the encoder known as the scanning frequency, above which the encoder output signals become unreliable. The scanning frequency is a function of the number of lines per angle or per unit length and the encoder speed. An encoder with a larger number of lines per angle or unit length will have a higher scanning frequency for the same encoder speed, as illustrated in FIG. 5. Therefore, the maximum permissible speed for an encoder with large number of lines per angle or unit length is less then for an encoder with a smaller number. The trade off dilemma between resolution and speed is addressed by the use of dual encoders as described above. The dual encoder system described herein enables the combination of high speed, high resolution motion with high resolution static positioning in a single actuator system.

Although these embodiments have been described in language specific to structural features and methodological acts, it is to be understood that the invention defined in the appended claims is not necessarily limited to the specific features or acts described in particular embodiments. The specific features and acts disclosed are to be understood as particularly graceful implementations of the claimed invention in an effort to illustrate rather than limit the present invention.

What is claimed is:

1. An apparatus, comprising:
a spindle assembly comprising a motor and a shaft;
a first encoder coupled to the shaft of the spindle assembly;
a second encoder coupled to the shaft of the spindle assembly, wherein the first encoder is a lower resolution, higher speed encoder relative to the second encoder and wherein the second encoder is a higher resolution, lower speed encoder relative to the first encoder;

a switch coupled to the first encoder and the second encoder to select between the first and second encoders;

a motion controller coupled to the switch and to the spindle assembly; and a motor current amplifier coupled between the motion controller and the spindle motor.

2. The apparatus of claim 1, wherein the first encoder and the second encoder are optical rotary encoders.

3. The apparatus of claim 1, wherein the first encoder is configured to control rotation of the spindle motor at a rotational velocity greater than 10,000 revolutions per minute and the second encoder has a quadrature output of greater than 15,000 counts per revolution.

4. The apparatus of claim 1, wherein the first encoder is configured to control rotation of the spindle assembly at a rotational velocity of approximately 12,000 revolutions per minute and the second encoder has a quadrature output of approximately 20,000 counts per revolution.

5. The apparatus of claim 1, wherein the switch is configured to receive a multiple pulse per revolution output signal from the first encoder and a multiple pulse per revolution output signal from the second encoder, and wherein the apparatus further comprises:

a phase locked loop (PLL) multiplier circuit coupled to receive the multiple pulse per revolution output signal from the first encoder and generate an output signal;

a first counter coupled to receive a single pulse per revolution output signal from the first encoder; and a second counter coupled to receive the output signal of the PLL multiplier circuit.

6. The apparatus of claim 5, wherein the output signal is an in-phase multiple of the input signal to the PLL.

7. An inspection system, comprising:

a spindle assembly comprising a spindle motor and a shaft configured to receive a workpiece;

a scanner configured to identify a defect location on the workpiece;

a marking tool configured to mark the defect location on the workpiece; and a motion control system, comprising a first encoder and a second encoder, coupled to the spindle assembly, the scanner and the marking tool, wherein the motion control system is configured to:

determine, using the first encoder, a first angular position of the shaft of the spindle assembly corresponding to the defect location identified by the scanner, correlate the first angular position of the shaft with the second encoder, and rotate the shaft of the spindle assembly to a second angular position using the second encoder to enable the mark tool to mark the defect location.

8. The inspection system of claim 7, wherein the first encoder is a lower resolution, higher speed encoder relative to the second encoder and wherein the second encoder is a higher resolution, lower speed encoder relative to the first encoder.

9. The inspection system of claim 8, wherein the first encoder is configured to rotate the spindle motor at a rotational velocity greater than 10,000 revolutions per minute and the second encoder has a quadrature output of greater than 15,000 counts per revolution.

10. The inspection system of claim 8, wherein the scanner is an optical scanner.

11. The inspection system of claim 8, wherein the marking tool is a mechanical scriber.

12. The inspection system of claim 8, the motion control system further comprises:

a switch coupled to the first encoder and the second encoder to select between the first and second encoders, wherein the switch is configured to receive a multiple pulse per revolution output signal from the first encoder and a multiple pulse per revolution output signal from the second encoder;

a motion controller coupled to the switch and to the spindle assembly;

a motor current amplifier coupled between the motion controller and the spindle motor;

a phase locked loop (PLL) multiplier circuit coupled to receive the multiple pulse per revolution output signal from the first encoder and generate an output signal; and one or more counters coupled to receive a single pulse per revolution output signal from the first encoder and the output signal of the PLL multiplier circuit.

\* \* \* \* \*